(12) United States Patent
Shaw et al.

(10) Patent No.: US 8,972,432 B2
(45) Date of Patent: Mar. 3, 2015

(54) MACHINE TRANSLATION USING INFORMATION RETRIEVAL

(75) Inventors: Hayden Shaw, Palo Alto, CA (US); Thorsten Brants, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1309 days.

(21) Appl. No.: 12/108,415

(22) Filed: Apr. 23, 2008

(65) Prior Publication Data

US 2014/0059033 A1 Feb. 27, 2014

(51) Int. Cl.
*G06F 17/00* (2006.01)
*G06F 17/30* (2006.01)

(52) U.S. Cl.
USPC .......................................... 707/760; 704/254

(58) Field of Classification Search
CPC .................................................. G06F 17/2872
USPC ............................ 707/756, 999.003; 704/254
See application file for complete search history.

(56) References Cited

U.S. PATENT DOCUMENTS

| | | | | |
|---|---|---|---|---|
| 6,131,082 A * | 10/2000 | Hargrave et al. | ................... | 704/7 |
| 6,356,865 B1 * | 3/2002 | Franz et al. | ........................ | 704/2 |
| 7,275,029 B1 * | 9/2007 | Gao et al. | .......................... | 704/9 |
| 7,949,514 B2 * | 5/2011 | Pacull | .............................. | 704/7 |
| 2002/0152081 A1 * | 10/2002 | Kitamura et al. | ............. | 704/277 |
| 2003/0061025 A1 * | 3/2003 | Abir | .................................. | 704/7 |
| 2005/0197827 A1 * | 9/2005 | Ross et al. | ......................... | 704/2 |
| 2005/0228643 A1 * | 10/2005 | Munteanu et al. | ................ | 704/9 |
| 2006/0004560 A1 * | 1/2006 | Whitelock | ........................ | 704/2 |
| 2006/0116866 A1 * | 6/2006 | Suzuki et al. | ..................... | 704/2 |
| 2006/0167675 A1 * | 7/2006 | Miyahira et al. | .................. | 704/2 |
| 2006/0190241 A1 * | 8/2006 | Goutte et al. | ..................... | 704/2 |
| 2007/0083359 A1 * | 4/2007 | Bender | ............................. | 704/9 |
| 2007/0094006 A1 * | 4/2007 | Todhunter et al. | ................ | 704/8 |
| 2008/0300857 A1 * | 12/2008 | Barbaiani et al. | ................. | 704/4 |
| 2009/0240487 A1 * | 9/2009 | Shen et al. | ........................ | 704/9 |

OTHER PUBLICATIONS

D. Smith, "Debabelizing Libraries—Machine Translation by and for Digital Collections", Mar. 2006, D-Lib Magazine, vol. 12, No. 3.*
Huang et al., "Hierarchical System Combination for Machine Translation", Jun. 2007, Association for Computational Linguistics.*
Kolss et al. "The ISL Statistical Machine Translation System for the TC-STAR Spring 2006 Evaluation", 2006, TC-STAR.*
Carbonell et al., "Context Based Machine Translation", 2006, The Association for Machine Translation in the Americas.*

\* cited by examiner

*Primary Examiner* — Jacob F Bétit
*Assistant Examiner* — Sheryl Holland
(74) *Attorney, Agent, or Firm* — Fish & Richardson P.C.

(57) ABSTRACT

Systems, methods, and apparatuses, including computer program products, are provided for machine translation using information retrieval techniques. In general, in one implementation, a method is provided. The method includes providing a received input segment as a query to a search engine, the search engine searching an index of one or more collections of documents, receiving one or more candidate segments in response to the query, determining a similarity of each candidate segment to the received input segment, and for one or more candidate segments having a determined similarity that exceeds a threshold similarity, providing a translated target segment corresponding to the respective candidate segment.

19 Claims, 5 Drawing Sheets

MACHINE TRANSLATION USING INFORMATION RETRIEVAL

BACKGROUND

The present disclosure relates to machine translation.

Machine translation systems are used to automatically translate text, speech, or other content from a source language to a target language. Conventional machine translation systems include dictionary-based machine translation, model-based machine translation, and instance-based machine translation.

Instance-based machine translation systems typically include a repository of source data and corresponding repository of target data. For example, a collection of documents in the source language and corresponding translated documents in the target language. An input segment, for example a sentence, is translated from the source language to the target language by identifying a matching segment in the example source data. Typically, a matching segment in the source data is found by testing the input segment one at a time against each segment in the source data to identify an exact match. The target language segment corresponding to the matching source segment is then provided as the translation of the input segment.

SUMMARY

Systems, methods, and apparatuses, including computer program products, are provided for machine translation using information retrieval techniques. In general, one aspect of the subject matter described in this specification can be embodied in methods that include the actions of providing a received input segment as a query to a search engine, the search engine searching an index of one or more collections of documents, receiving one or more candidate segments in response to the query, determining a similarity of each candidate segment to the received input segment, and for one or more candidate segments having a determined similarity that exceeds a threshold similarity, providing a translated target segment corresponding to the respective candidate segment. Other embodiments of this aspect include corresponding systems, apparatus, and computer program products.

These and other embodiments can optionally include one or more of the following features. The aspect can further include, for a candidate segment having a determined similarity that does not exceed the threshold similarity, identifying one or more subsegments of the input segment and providing one or more candidate subsegments corresponding to each of the one or more subsegments of the input segment. The aspect can further include identifying a non-matching subsegment of the candidate segment that does not match the corresponding subsegment of the input segment, identifying a matching candidate subsegment, and substituting the matching candidate subsegment for the non-matching candidate subsegment.

Identifying a matching candidate subsegment can further include providing the identified subsegments as queries to the search engine, receiving the one or more candidate subsegments for each identified subsegment, and determining similarity of the candidate subsegments to the corresponding identified subsegment. The aspect can further include, for candidate subsegments having a similarity that does not exceed the threshold similarity, using a model-based statistical machine translation to identify target subsegments corresponding to the input subsegments.

The aspect can further include receiving an input adjusting the similarity threshold, where adjusting the similarity threshold results in different sized candidate subsegments. The aspect can further include, providing target subsegments for each candidate subsegments having a determined similarity to the corresponding subsegment of the input segment that exceeds a threshold similarity. Providing target subsegments can include using alignment data for the candidate subsegment to identify a location of the target subsegment in a repository. Providing the target segment corresponding to the candidate segment can include using alignment data for the candidate segment to identify a location of the corresponding target segment.

In general, one aspect of the subject matter described in this specification can be embodied in methods that include the actions of generating a hierarchical aligned repository of documents, the hierarchical aligned repository of documents including a plurality of segments, each segment being part of a pair that includes a source segment and a translated target segment, each source segment being aligned to a corresponding target segment, the plurality of segment including a hierarchy of segments having multiple segment levels, indexing each source segment of the repository, the indexing identifying each location of the respective source segment in the repository, and using information retrieval to search the index to identify one or more translated target segments for a given input segment. Other embodiments of this aspect include corresponding systems, apparatus, and computer program products.

These and other embodiments can optionally include one or more of the following features. The aspect can further include generating a target index of the target segments from the repository of paired segments, where the index and target index are symmetric. The index can further include alignment data for each segment, the alignment data identifying a location of the corresponding target segment. The aspect can further include generating one or more alignment tables, the alignment tables identifying alignment information for each segment in the repository. Indexing can include generating an inverted index. The multiple segment levels can include paragraphs, sentences, and words.

Particular embodiments of the subject matter described in this specification can be implemented to realize one or more of the following advantages. Information retrieval techniques can be used to provide quick retrieval in large data sets. Recursive techniques can be used to decompose segments into subsegments to provide greater translation accuracy. A user can ask the system to produce translations composed of retrieved target language segments at different levels of granularity.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
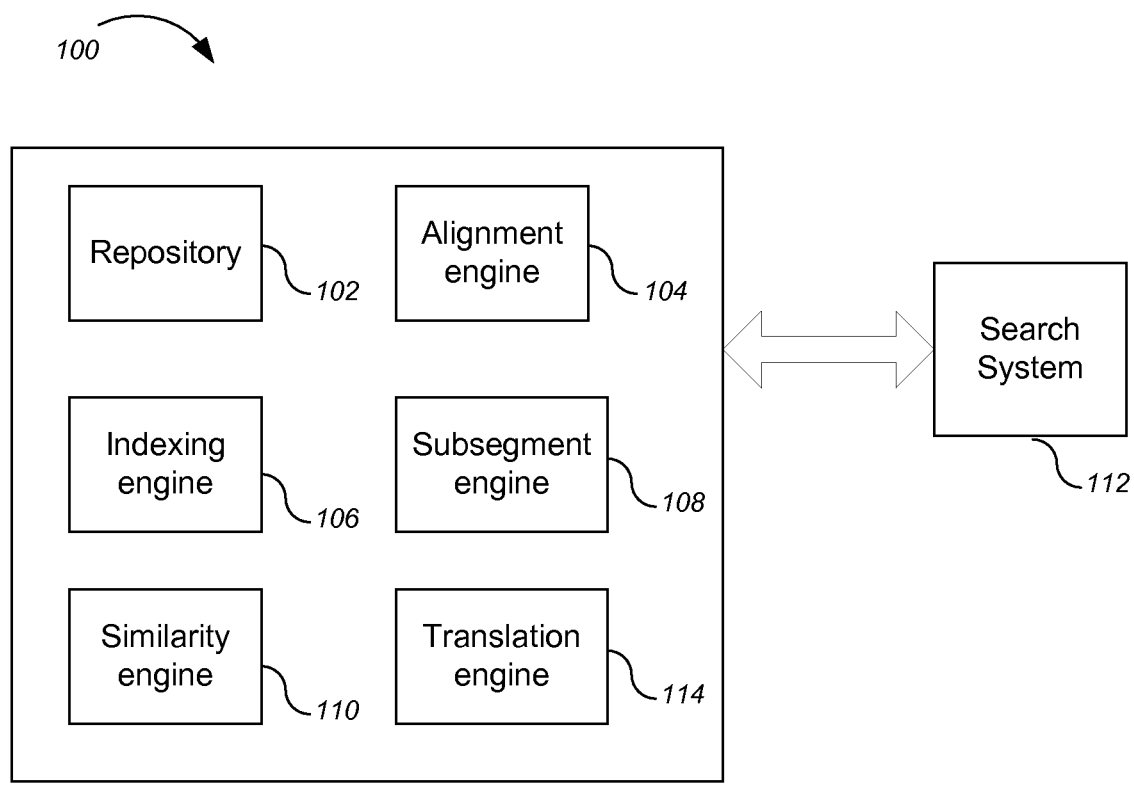
FIG. 1 is a block diagram illustrating an example machine translation system.

FIG. 1 is a block diagram illustrating an example machine translation system 100. Machine translation system 100 includes a parallel repository 102, an alignment engine 104, an indexing engine 106, a subsegment engine 108, a similarity engine 110, and a translation engine 114. The machine translation system can include, or be coupled to, a search system 112. For example, the components of the machine translation system 100 and the search system 112 can communicate across one or more networks.

The parallel repository 102 includes a collection of documents in a source language (e.g., French) and corresponding translation collections of documents in one or more target languages (e.g., English). The parallel repository 102 can include a number of different document types, including, e.g., web page and news article pairs where each pair includes text in the source language and the corresponding translated text in the target language. In another example, the parallel repository 102 can include multi-lingual data. For example, United Nations proceedings are available which provide parallel translations in six languages.

In some implementations, the parallel repository 102 includes one or more collections of documents where each collection is associated with a different language. In some implementations, one collection of documents is designated a source collection and each other collection is designated as a target collection (e.g., the language to which an input in the source language is translated). Alternatively, any two collections of documents can be designated as a respective pair of source and target document collections depending on the translation to be performed.

Source language documents in the collection are hierarchically aligned with corresponding documents in one or more target language collections. For example, the parallel repository 102 can be a hierarchically aligned bilingual repository (e.g., a single source language hierarchically aligned with a single target language). Alternatively, in some implementations, each collection of documents is hierarchically aligned with each other collection of documents such that any combination of collections of documents to provide multiple hierarchically aligned collections of documents.

The hierarchical aligned documents in the parallel repository 102 provide paired segments associating content in one collection of documents with corresponding content in another collection of documents. For example, for particular source and target collections, each paired segment includes a source language segment and its corresponding translation into a target language segment. Paired segments can be identified according to the alignment of the collections in the repository.

A segment can be an entire document or a portion of a document including a paragraph, a sentence, a phrase, or other portion. In some implementations, segments are paired at more than one segment level (e.g., at both paragraph and sentence levels to form hierarchical aligned pairs). Thus, the repository 102 can include pairs of more than one segment size for the same collection of source and target documents. Paired segments can be decomposed into paired subsegments (e.g., smaller included segments of a larger segment), for example, using subsegment engine 108, which is described below.

The alignment engine 104 hierarchically aligns segments from the collection of source language documents to segments from the collection of target documents. The term "alignment" will be used to refer to a data structure that represents a segment-for-segment connection between source and target segments in a pair of documents. In some implementations, the alignment is simply a vector identifying positions of source segments that various target segments connect to. For example, a particular word in a source document can be aligned with a corresponding translated word or words in a target document (e.g., that a word segment "hello" in one source sentence aligns with the word segment "bonjour" of a target sentence). Hierarchical alignment aligns documents from one collection to documents of another collection at multiple segment levels (e.g., document segments, paragraph segments, sentence segments). Alignment can be performed using a number of techniques. For example, some alignments can be manually generated, e.g., by one or more individuals. Alternatively, statistical techniques can be used to generate an alignment between segments.

For example, if the source and target collections include parallel documents (e.g., each document in the source collection has a corresponding translated document in the target collection), documents in the source and target collections can be analyzed using, for example, an iterative process, e.g., expectation-maximization algorithm, to find likely connections between source and target segments.

Additional details on alignment can be found, for example, in Franz Joseph Och and Hermann Ney, *A Systematic Comparison of Various Statistical Alignment Models*, Computational Linguistics, 29(1): 9-51, March 2003.

The subsegment engine 108 identifies subsegments from segments. Subsegments are smaller segments formed from a given segment. For example, a document segment can be divided into paragraphs segments, which are referred to in some implementations as subsegments of the document segment. Subsegments are formed from one or more of the segments and represent segments of a lesser level. For example, a document segment can be separated into paragraph subsegments. In some implementations, the subsegments can be further divided into sentence subsegments, word subsegments, character subsegments, etc.

The indexing engine 106 indexes the repository 102. In some implementations, the indexing engine 106 only indexes the source collection of documents. Alternatively, the indexing engine 106 generates an index for both the source collection and the target collections in the parallel repository 102. The generated index can be, for example, an inverted index identifying a location for each source segment in the parallel repository 102. For example, a word segment can be indexed to identify each document of the collection in which the word occurs along with the specific position within the respective document (e.g., document 52, position 3). In some implementations, the index also includes alignment information identifying a location of one or more corresponding target segments (e.g., identifying a target document and position).

The search system 112 identifies one or more source segments associated with an input segment using one or more information retrieval techniques. When an input is received at the machine translation system 100, the input (e.g., a segment to be translated) can be provided as a query to the search system 112. For example, when the input is received, the input is transmitted as a query through one or more wired or wireless networks to the search system 112. The search system 112 can be implemented as, for example, computer programs running on one or more computers in one or more locations that are coupled to each other through a network.

The search system 112 can include a search engine. The search system 112 responds to the query by generating search results, for example, results identifying the locations in the repository corresponding to the query.

When the query is received by the search engine, the search engine uses information retrieval techniques to identify relevant resources (e.g., documents in a source collection). The search engine will generally use an index (e.g., provided in an index database by indexing engine 106) that actively searches the parallel repository 102. For example, the inverted index for a particular collection of documents can be searched.

The similarity engine 110 determines a similarity measure between input segments and candidate source language segments. The similarity engine uses one or more criteria to determine whether the similarity between an input segment and a candidate source language segment exceeds a specified threshold level. For example, the similarity measure can be an edit-distance measure that computes a minimum number of edits applied to the input segment to yield the candidate source language segment.

The search engine will generally include a ranking engine (or other software) to rank the resources related to the query. The ranking of the resources can be performed using conventional techniques for determining an information retrieval score for indexed resources in view of a given query. The relevance of a particular resource with respect to a particular query term or to other provided information may be determined by any appropriate technique.

The translation engine 114 identifies one or more target segments corresponding to a source segment. For example, the translation engine 114 can use alignment information associated with the source segment to identify one or more corresponding target segments.

Figure 2:
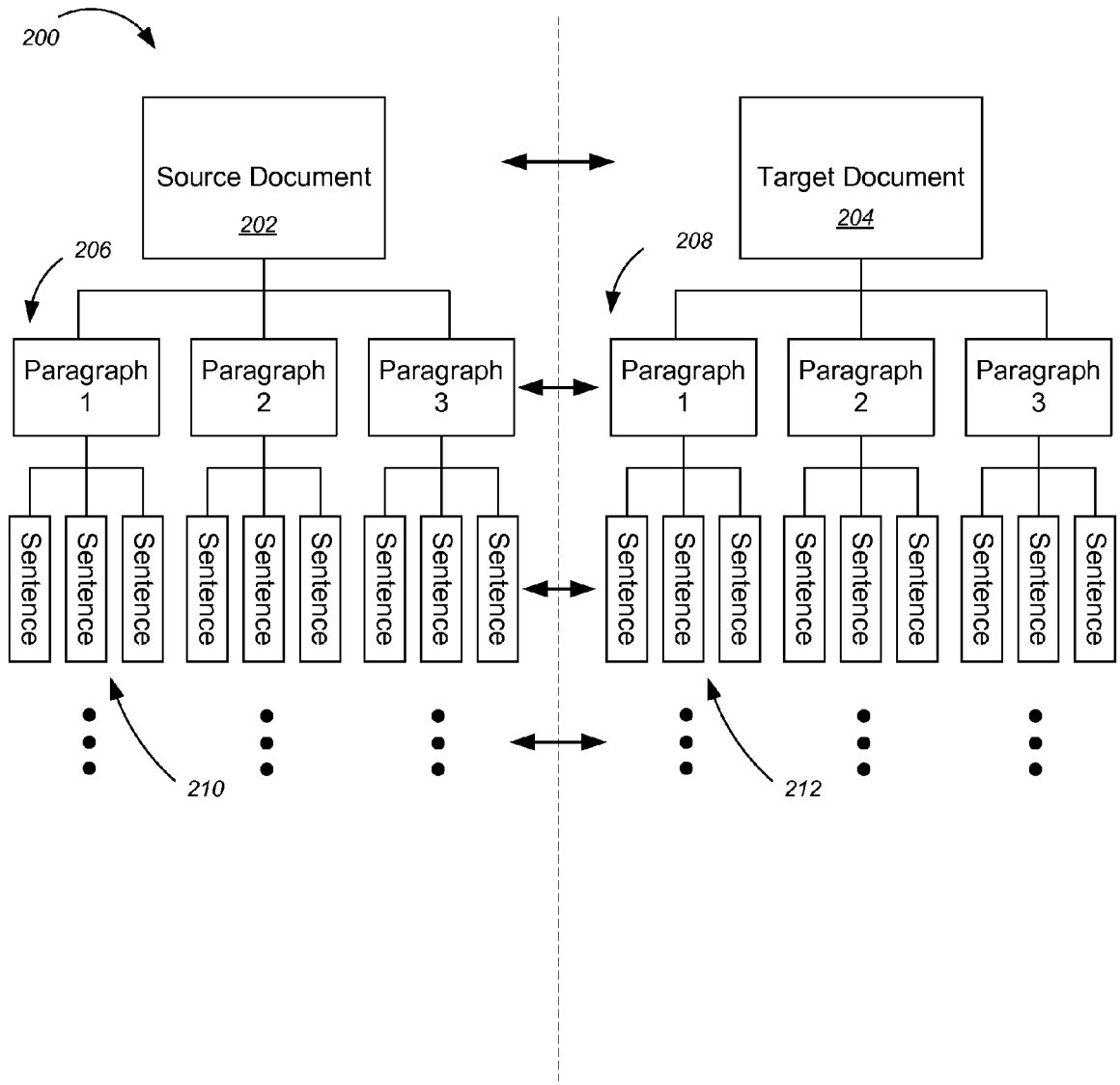
FIG. 2 is a block diagram illustrating an example of a hierarchically aligned bilingual repository.

FIG. 2 is a block diagram illustrating an example of a hierarchically aligned bilingual repository 200. In the hierarchically aligned bilingual repository 200, documents of the repository are aligned for segments of multiple levels. For example, at a high level, source document 202 can be aligned with target document 204. However, having aligned documents does not mean that the sentences of the two documents are aligned. For example, two news stories that are translations of each other can be aligned as documents about the same news story. However, without aligning the content of the stories at a more refined level, it is not known which particular sentences of the source news story correspond to particular sentences of the target news story.

Hierarchically aligned documents allow for the identification of corresponding portions of the documents at several segment levels. For example, in the hierarchical aligned bilingual repository 200, the levels of alignment are illustrated for a particular source document 202 and target document 204. Source document 202 includes three source paragraphs 206. The target document 204 includes three target paragraphs 208. The source paragraphs 206 and the target paragraphs 208 are also aligned. Additionally, each source paragraph 206 includes source sentences 210 and each target paragraph 208 includes target sentence 212. The source sentences 210 and target sentences 212 can also be aligned. Thus for example, a given sentence of the source document 202 is aligned with a corresponding translated sentence in the target document 204.

Further alignments between the source document 202 and target document 204 can also be performed. For example, alignments can be identified according to phrases or words in the documents. Additionally, in some implementations, alignments are identified at the character level. For example, in some ideographic languages (e.g., Chinese, Japanese, Korean), individual characters can be aligned.

Figure 3:
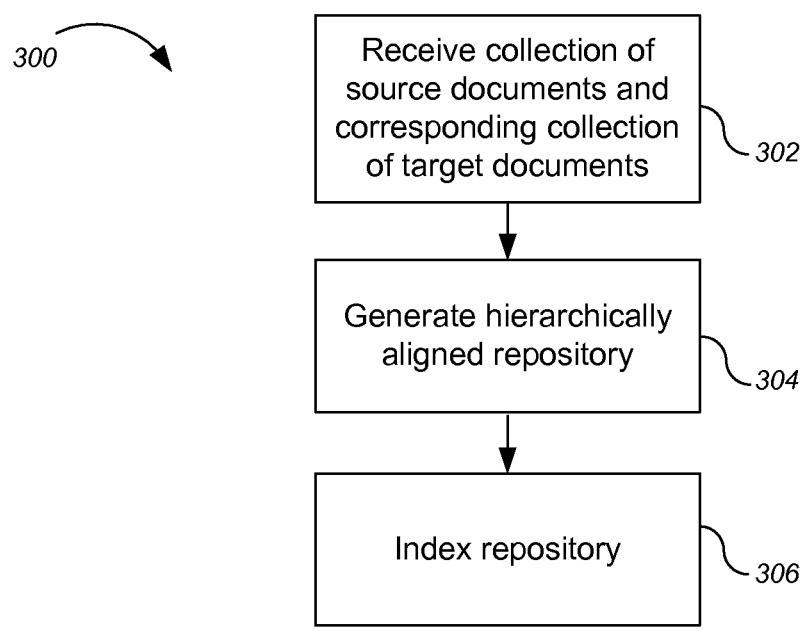
FIG. 3 is a flow chart illustrating an example method for generating a hierarchically aligned bilingual repository.

FIG. 3 is a flowchart illustrating an example method 300 for generating a hierarchically aligned bilingual repository. For convenience, the method 300 will be described with respect to a system that performs the method 300.

The system receives 302 a collection of source documents and a corresponding collection of target documents (e.g., to be included in repository 102 of FIG. 1). For example, the source and target documents can be a web corpus of news articles where the target documents represent translated news articles of source documents into a particular language. In some implementations, the collection of source and target documents are received from an external parallel corpus. For example, the United Nations proceedings providing parallel translations in six languages or a parallel corpus of news stories translated for different countries (e.g., a news organization can provide a web page including stories in multiple languages for readers in various countries). Alternatively, in other implementations, the collection of source documents and target documents are retrieved from the web, for example, as news stories.

In some implementations, multiple collections of documents can be received, each having documents corresponding to translations of documents of other collections into another language. Each of the collections of documents can be a source collection or a target collection depending on the translation to be performed. For example, for translations of a French input into English, the source collection of documents can be French while the target collection of documents can include corresponding English translations of the source collection of documents.

The system generates 304 a hierarchically aligned repository (e.g., using alignment engine 104). The repository can include multiple collections of documents. The hierarchically aligned repository includes one or more hierarchically aligned pairs of source and target collections of documents. The system can generate the hierarchical alignment for a given source and target collection of documents manually or using statistical techniques. The statistical techniques can include using, for example, an iterative process, e.g., an expectation-maximization algorithm, to find likely connections between source and target segments.

Alternatively, in some implementations, the system receives a repository that includes one or more collections of documents that have already been hierarchically aligned with respect to each other. Thus, for example, the system can receive multiple collections of documents and alignment data that identifies one or more hierarchical alignments between paired collections of documents, for example, identifying the alignments between particular source and target document segments.

The resulting hierarchical aligned repository provides alignment information at multiple segment levels for a given source collection of documents and target collection of documents. For example, for a given source segment (e.g., a sentence), the alignment information identifies a location in the target collection of documents for a particular location in a target document that is a translation of the source segment. Similar alignment data is provided at different hierarchical levels, for example, document, paragraph, phrase, and word levels. In some implementations, the alignments between source and target collections of documents are bi-directional such that the alignment data also identifies locations in source documents corresponding to segments in the target documents.

The system indexes 306 the hierarchical aligned repository (e.g., using indexing engine 106). In some implementations, a single source collection of documents in the repository is indexed. Alternatively, in some other implementations, each collection of documents is similarly indexed such that any collection of documents can be used as the source collection of documents.

The indexing identifies locations in the corresponding collection of documents for each segment of the collection of documents. For example, if the segment is a particular word, the indexing identifies each location of the word within the collection of documents. For example, by document number and position within the document. In some implementations, the index includes segments of each level, e.g., paragraphs, sentences, phrases, and words. In some implementations, the index is an inverted index. An inverted index is an index that stores a mapping from segments to their positions in a collection of documents. The index can be used for searching the collection of documents, for example, using information retrieval techniques to identify locations of segments in the collection of documents. An example of searching the index is described below.

Additionally, the index for each collection of documents can include the corresponding alignment information for one or more other collections of documents. Thus, the index not only identifies positions of the segment within the source collection of documents, but also identifies corresponding translations of the segment in one or more target collections of documents.

Alternatively, alignment information can be stored in the parallel repository (e.g., parallel repository 102). For example, the parallel repository can include one or more tables including alignment information at each hierarchal segment level. In some implementations, the tables include nested alignment information. For example, a table can include the alignment information for a pair of documents. For each aligned paragraph in the table, the paragraph entry can include nested alignment information for smaller segments (e.g., sentences). Each sentence can include further alignment information for the table, for example, between words.

Figure 4:
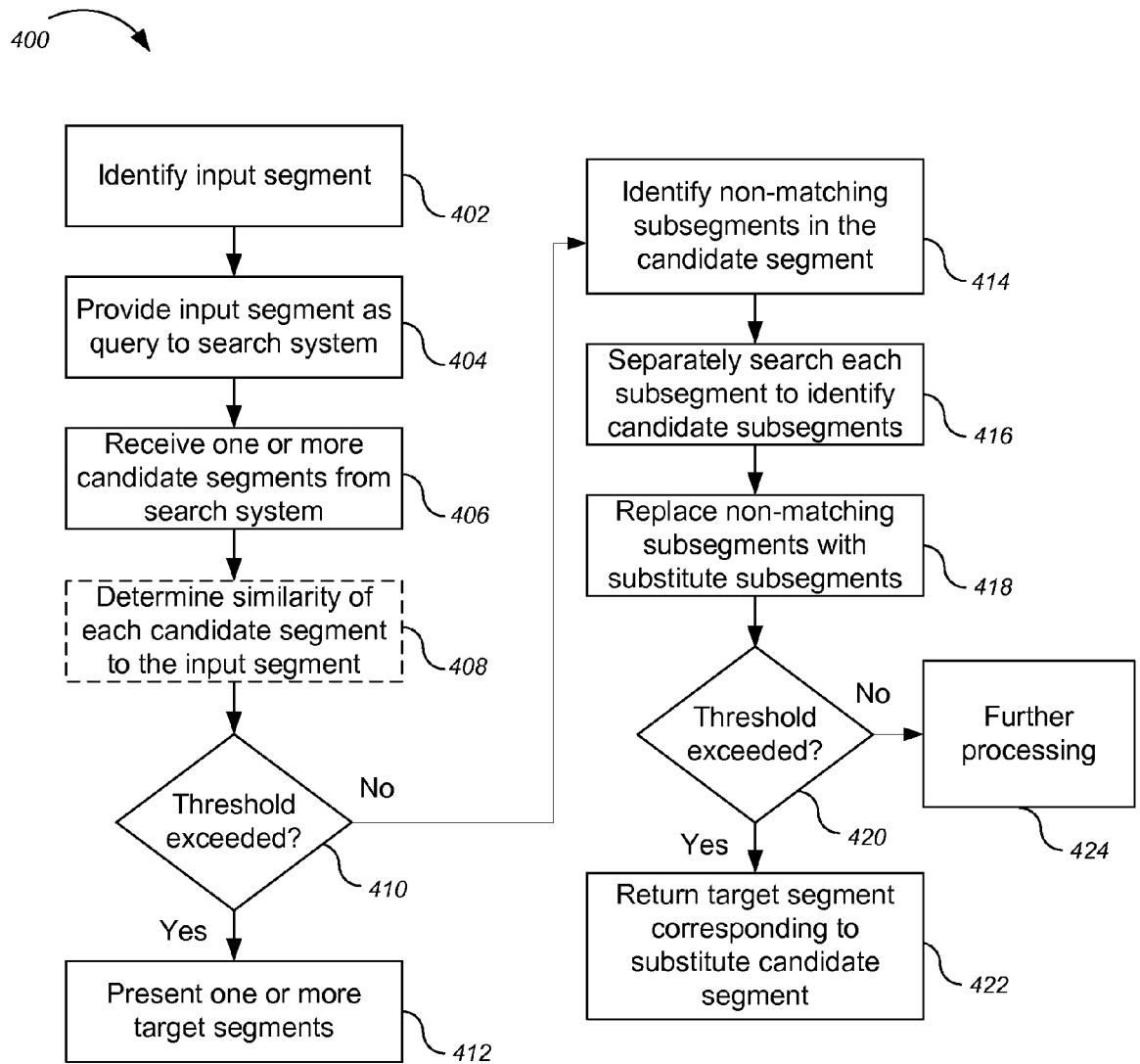
FIG. 4 is a flow chart illustrating an example method for searching an aligned bilingual repository.

FIG. 4 is a flowchart illustrating an example method 400 for searching an aligned repository (e.g., parallel repository 102). For convenience, the method 400 will be described with respect to a system that performs the method 400.

The system receives 402 an input segment. The input segment can be received, for example, from a user. The input segment can be an entire document, a paragraph, sentence, or phrase. The input segment can be received, for example, as part of a request for a translation of the input segment. Additionally, in some implementations, the input segment is part of a sequence of input segments to be translated into a particular target language.

The system provides 404 the input segment as a query to a search system (e.g., search system 112 of FIG. 1). The search system uses the input segment to search the source collection of documents. In some implementations, the search system uses an index for the source collection of documents and searches using conventional information retrieval techniques.

In some implementations, the search system breaks the input segment into lower level segments. For example, if the input segment is a sentence, the search system can break the sentence into word segments and then perform the searching for each word, e.g., using an inverted index. In some implementation, the search system searches for the lower level segments as an OR query. However, the OR query can be conditioned to discard results that do not include a threshold number of the lower level segments. In some implementations, common segments (e.g., stop words) are discounted or removed from the search, for example, "a" and "the". In some implementations, words can be weighted, for example, using inverse document frequency.

In some other implementations, the search system uses the index for the source collection of documents to search for the query terms (e.g., words in an input sentence) while requiring the terms to be within a specified edit distance of each other. Thus, for example, a document identified as including a match to the input segment can include the query terms grouped together within some specified amount. In some implementations, the query terms are limited to the exact order with possible intervening words. For example, for each word the index is searched to identify one or more locations (e.g., document and position) for the word in the source collection to documents. For a sentence to match, the system can require that the identified locations for each word be within a threshold distance of each other.

The search system can identify one or more candidate results for the input segment. The system receives 406 the one or more candidate results from the search system. For example, if the input segment is a document, the search system can return one or more candidate documents from the source collection. In some implementations, the search system returns the candidate results in a ranked order, for example, based on how similar the candidate results are to the input segment. In other implementations, the search system provides all candidate results that satisfy some baseline criteria without ranking. The machine translation system can then rank the candidate segments using one or more criteria (e.g., based on a similarity between each candidate segment and the input segment).

The system determines 408 the similarity of each candidate segment to the input segment. For example, the system can determine similarity of each candidate segment to the input segment according to how closely the candidate segment matches the input segment. For example, the more words of the input segment that are found in the candidate segment, the more similar the two segments are. In another example, the smaller the edit distance of the candidate segment to the input segment, the more similar the candidate segment is taken to be to the input segment. The edit distance refers to the number of operations necessary (e.g., insertion, deletion, and substitution) to match a candidate segment to the input segment. The similarity can be determined by the search system or by another system component (e.g., similarity engine 110). In some implementations, the system assigns a similarity score to each candidate segment quantifying the degree of similarity between the candidate segment and the input segment.

Whether the similarity of the candidate segments is identified by the search system or by the system separately, the system determines 410 whether one or more of the candidate segments exceed a threshold similarity amount.

When the threshold is exceeded for one or more candidate segments, the system presents 412 one or more corresponding target segments (e.g., to a user). For example, for each candidate segment that exceeds the threshold, the corresponding target language segment can be identified, e.g., using the alignment information associated with the input segment. For example, the search system can receive alignment information with the candidate segments as part of the index information for the candidate segments (e.g., when alignment is included along with the inverted index data). Alternatively, the search system can identify alignment information for a given candidate segment using alignment data stored, for example, as one or more alignment tables in the parallel repository.

In some implementations, more than one target language segment is presented to the user for selection. For example, a user interface can present the target language segments to the user. The user can then identify a particular target language segment to use as the translation of the input segment. Alternatively, the system can identify a single candidate segment that has a highest similarity level and then present the corresponding target language segment.

When the threshold is not exceeded, the system identifies 414 one or more non-matching subsegments of the candidate input segment. For example, if the input segment is the sentence "ACME Corporation made an offer of 100 million dollars for the shares of ABC Corporation," the identified candidate sentences may include all of the words except those specific to this deal e.g., the name of the companies and the amount. For example, one candidate segment identified can be "Widget Corporation made and offer of 50 million dollars for the shares of XYZ Corporation."

The differences between the input segment and the candidate sentence can result in a similarity that does not exceed the specified threshold. Thus, the system would not use the candidate sentence as a whole in translating the input segment. However, several subsegments (e.g., words) in the candidate segment can have a high confidence of matching the input segment, leaving only a few subsegments as non-matching.

The system identifies "ACME" "100" and "ABC" as subsegments of the input segment that are non-matching with the candidate segment. The system separately searches 416 each of these subsegments, which are simply lower level segments (e.g., words of the sentence), using the search system to identify candidate subsegments. The system searches for each of the subsegments in a similar manner as the system searched for the entire sentence segment. For example, a search system can use the index for the collection of documents to identify the location of subsegments.

The system replaces 418 the non-matching subsegments of the candidate segment with substitute subsegments. For example, the subsegments "ACME" and "ABC" can replace the non-matching subsegments "Widget" and "XYZ" of the candidate segment, if found in the collection of documents. Consequently, a substitute candidate segment can be formed that includes subsegments that initially matched and substitute subsegments for non-matching portions of the candidate segment.

The system determines 420 whether the substitute candidate segment exceeds the similarity threshold. Similarity of the substitute candidate segment can be based on the same criteria as determining the similarity of the candidate segment (e.g., matching words, edit distance).

When the substitute candidate segment exceeds the similarity threshold, the system the system presents 422 one or more corresponding target segments (e.g., to a user). For example, for each substitute candidate segment that exceeds the threshold, the corresponding target language segment can be identified, e.g., using the alignment information associated with the input segment. For example, the search system can receive alignment information with the candidate segments as part of the index information for the candidate segments (e.g., when alignment is included along with the inverted index data). Alternatively, the search system can identify alignment information for a given candidate segment using alignment data stored, for example, as one or more alignment tables in the parallel repository.

When the substitute candidate segment does not exceed the similarity threshold, the system performs 424 further processing. In some implementations, the further processing includes one or more recursive searches for substitute subsegments at increasingly lower segment levels. For example, for an input segment that is a document, a substitute candidate segment can include a document having substitute paragraph level subsegments for one or more non-matching paragraphs. However, if the similarity threshold is not exceeded for the substitute candidate segment, the system can then search for non-matching sentence subsegments of the non-matching paragraphs to form another substitute candidate segment using substitute sentence subsegments. Similarly, additional recursions can include phrase and word substitutions until the similarity threshold is met.

In some implementations, the system allows the user to increase or decrease the similarity threshold, resulting in translations with smaller or larger segments. In some other implementations, if the similarity threshold is not met, with or without recursive substitutions, the system can fail over to a model-based translation. For example, a model-based system using a language model and translation model can be used to predict a translated target segment based on probabilistic data derived from a corpus of text in the source and target languages.

Alternatively, in some other implementations, the system can present an imperfect match to the user either with or without recursive attempts to provide a higher similarity match. For example, the system can provide a target language segment that had the highest similarity to the input segment. In some implementations, the system can identify (e.g., using highlighting or other visual cues) non-matching portions (e.g., particular word or sentence subsegments) in the provided target language segment.

In some implementations, the system provides additional information when presenting one or more target language segments. For example, when providing target language segments that are documents, the system can identify the source of the document. Thus, if the input document is a news article, the user can identify the organization responsible for the target language documents. The user can then make a selection of a target language document based on a source that the user considers more reliable or reputable.

The system can be used to provide instance based translations for various applications including language translation, speech recognition, and query correction/expansion.

Figure 5:
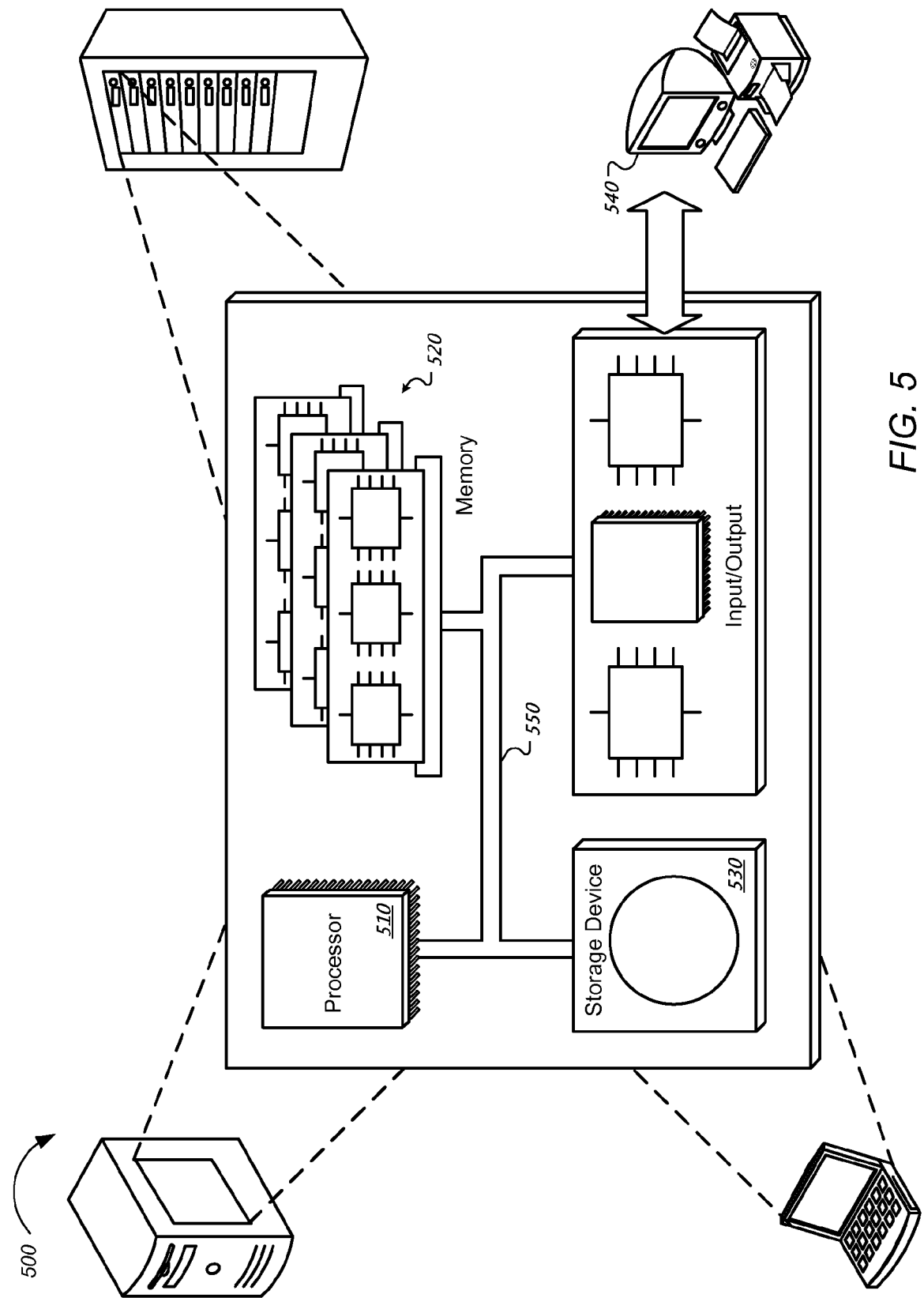
FIG. 5 is a schematic diagram of an example computer system.

FIG. 5 is a schematic diagram of an example computer system 500. The system 500 can be used for the operations described in association with the method 300 shown in FIG. 3, according to one implementation or the method 400 shown in FIG. 4, according to another implementation.

The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540. In some embodiments, a parallel processing set of systems 500 connected over a network may be employed, clustered into one or more server centers.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 includes a keyboard and/or pointing device. In another implementation, the input/output device 540 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
providing a received input segment of text in a source language to be translated into a particular target language as a query to a search engine, the search engine searching an index of one or more collections of documents;
receiving one or more candidate segments in the source language in response to the query;
determining a similarity of each candidate segment to the received input segment;
for one or more candidate segments in the source language having a determined similarity that exceeds a threshold similarity, providing a translated target segment corresponding to the respective candidate segment as a target language translation of the input segment; and
for a candidate segment in the source language having a determined similarity that does not exceed the threshold similarity:
identifying one or more subsegments of the input segment,
providing each of the one or more subsegments of the input segment as a respective query to the search engine, and
for each provided subsegment:
receiving one or more candidate subsegments in the source language in response to the respective query, and
determining a similarity of each candidate subsegment to the provided subsegment;
using the similarity of the one or more candidate subsegments to determine one or more non-matching subsegments of the one or more subsegments;
replacing the one or more non-matching subsegments with respective substitute subsegments in the source language to form a substitute candidate segment; and
in response to determining that the substitute candidate segment has a similarity to the input segment exceeding the threshold similarity, providing a translated target segment in the target language corresponding to the substitute candidate segment in the source language as a target language translation of the input segment.

2. The method of claim 1, further comprising:
for candidate subsegments having a similarity that does not exceed the threshold similarity, using a model-based statistical machine translation to identify target subsegments corresponding to the input subsegments.

3. The method of claim 2, further comprising:
receiving an input adjusting the similarity threshold, where adjusting the similarity threshold results in different sized candidate subsegments.

4. The method of claim 1, further comprising:
providing target subsegments for each candidate subsegments having a determined similarity to the corresponding subsegment of the input segment that exceeds a threshold similarity.

5. The method of claim 4, where providing target subsegments includes using alignment data for the candidate subsegment to identify a location of the target subsegment in a repository.

6. The method of claim 1, where providing the target segment corresponding to the candidate segment further includes:
using alignment data for the candidate segment to identify a location of the corresponding target segment.

7. A system comprising:
one or more computers operable to perform operations including:
providing a received input segment of text in a source language to be translated into a particular target language as a query to a search engine, the search engine searching an index of one or more collections of documents;
receiving one or more candidate segments in the source language in response to the query;
determining a similarity of each candidate segment to the received input segment;
for one or more candidate segments in the source language having a determined similarity that exceeds a threshold similarity, providing a translated target segment corresponding to the respective candidate segment as a target language translation of the input segment; and
for a candidate segment in the source language having a determined similarity that does not exceed the threshold similarity:
identifying one or more subsegments of the input segment,
providing each of the one or more subsegments of the input segment as a respective query to the search engine, and
for each provided subsegment:
receiving one or more candidate subsegments in the source language in response to the respective query, and
determining a similarity of each candidate subsegment to the provided subsegment;
using the similarity of the one or more candidate subsegments to determine one or more non-matching subsegments of the one or more subsegments;
replacing the one or more non-matching subsegments with respective substitute subsegments in the source language to form a substitute candidate segment; and
in response to determining that the substitute candidate segment has a similarity to the input segment exceeding the threshold similarity, providing a translated target segment in the target language corresponding to the substitute candidate segment in the source language as a target language translation of the input segment.

8. The system of claim 7, the system further operable to perform operations comprising:
for candidate subsegments having a similarity that does not exceed the threshold similarity, using a model-based statistical machine translation to identify target subsegments corresponding to the input subsegments.

9. The system of claim 8, the system further operable to perform operations comprising:
receiving an input adjusting the similarity threshold, where adjusting the similarity threshold results in different sized candidate subsegments.

10. The system of claim 7, the system further operable to perform operations comprising:
providing target subsegments for each candidate subsegments having a determined similarity to the corresponding subsegment of the input segment that exceeds a threshold similarity.

11. The system of claim 10, where providing target subsegments includes using alignment data for the candidate subsegment to identify a location of the target subsegment in a repository.

12. The system of claim 7, where providing the target segment corresponding to the candidate segment further includes:
using alignment data for the candidate segment to identify a location of the corresponding target segment.

13. A computer program product, encoded on a non-transitory computer-readable medium, operable to cause data processing apparatus to perform operations comprising:
providing a received input segment of text in a source language to be translated into a particular target language as a query to a search engine, the search engine searching an index of one or more collections of documents;
receiving one or more candidate segments in the source language in response to the query;
determining a similarity of each candidate segment to the received input segment;
for one or more candidate segments in the source language having a determined similarity that exceeds a threshold similarity, providing a translated target segment corresponding to the respective candidate segment as a target language translation of the input segment; and
for a candidate segment in the source language having a determined similarity that does not exceed the threshold similarity:
identifying one or more subsegments of the input segment,
providing each of the one or more subsegments of the input segment as a respective query to the search engine, and
for each provided subsegment:
receiving one or more candidate subsegments in the source language in response to the respective query, and
determining a similarity of each candidate subsegment to the provided subsegment;
using the similarity of the one or more candidate subsegments to determine one or more non-matching subsegments of the one or more subsegments;
replacing the one or more non-matching subsegments with respective substitute subsegments in the source language to form a substitute candidate segment; and
in response to determining that the substitute candidate segment has a similarity to the input segment exceeding the threshold similarity, providing a translated target segment in the target language corresponding to the substitute candidate segment in the source language as a target language translation of the input segment.

14. The computer program product of claim 13, further operable to perform operations comprising:
for candidate subsegments having a similarity that does not exceed the threshold similarity, using a model-based statistical machine translation to identify target subsegments corresponding to the input subsegments.

15. The computer program product of claim 14, further operable to perform operations comprising:
receiving an input adjusting the similarity threshold, where adjusting the similarity threshold results in different sized candidate subsegments.

16. The computer program product of claim 13, further operable to perform operations comprising:
providing target subsegments for each candidate subsegments having a determined similarity to the corresponding subsegment of the input segment that exceeds a threshold similarity.

17. The computer program product of claim 16, where providing target subsegments includes using alignment data for the candidate subsegment to identify a location of the target subsegment in a repository.

18. The computer program product of claim 13, where providing the target segment corresponding to the candidate segment further includes:
using alignment data for the candidate segment to identify a location of the corresponding target segment.

19. A system comprising:
one or more computers configured to perform operations comprising:
providing a received input segment of text in a source language to be translated into a particular target language as a query to a search engine, the search engine searching an index of one or more collections of documents;
receiving one or more candidate segments in the source language in response to the query;
determining a similarity of each candidate segment to the received input segment;
for one or more candidate segments in the source language having a determined similarity that exceeds a threshold similarity, providing a translated target segment corresponding to the respective candidate segment as a target language translation of the input segment; and
for a candidate segment in the source language having a determined similarity that does not exceed the threshold similarity, means for:
identifying one or more subsegments of the input segment,
providing each of the one or more subsegments of the input segment as a respective query to the search engine, and
for each provided subsegment:
receiving one or more candidate subsegments in the source language in response to the respective query, and
determining a similarity of each candidate subsegment to the provided subsegment;

using the similarity of the one or more candidate subsegments to determine one or more non-matching subsegments of the one or more subsegments;

replacing the one or more non-matching subsegments with respective substitute subsegments in the source language to form a substitute candidate segment; and in response to determining that the substitute candidate segment has a similarity to the input segment exceeding the threshold similarity, providing a translated target segment in the target language corresponding to the substitute candidate segment in the source language as a target language translation of the input segment.

* * * * *